United States Patent Office 3,560,168
Patented Feb. 2, 1971

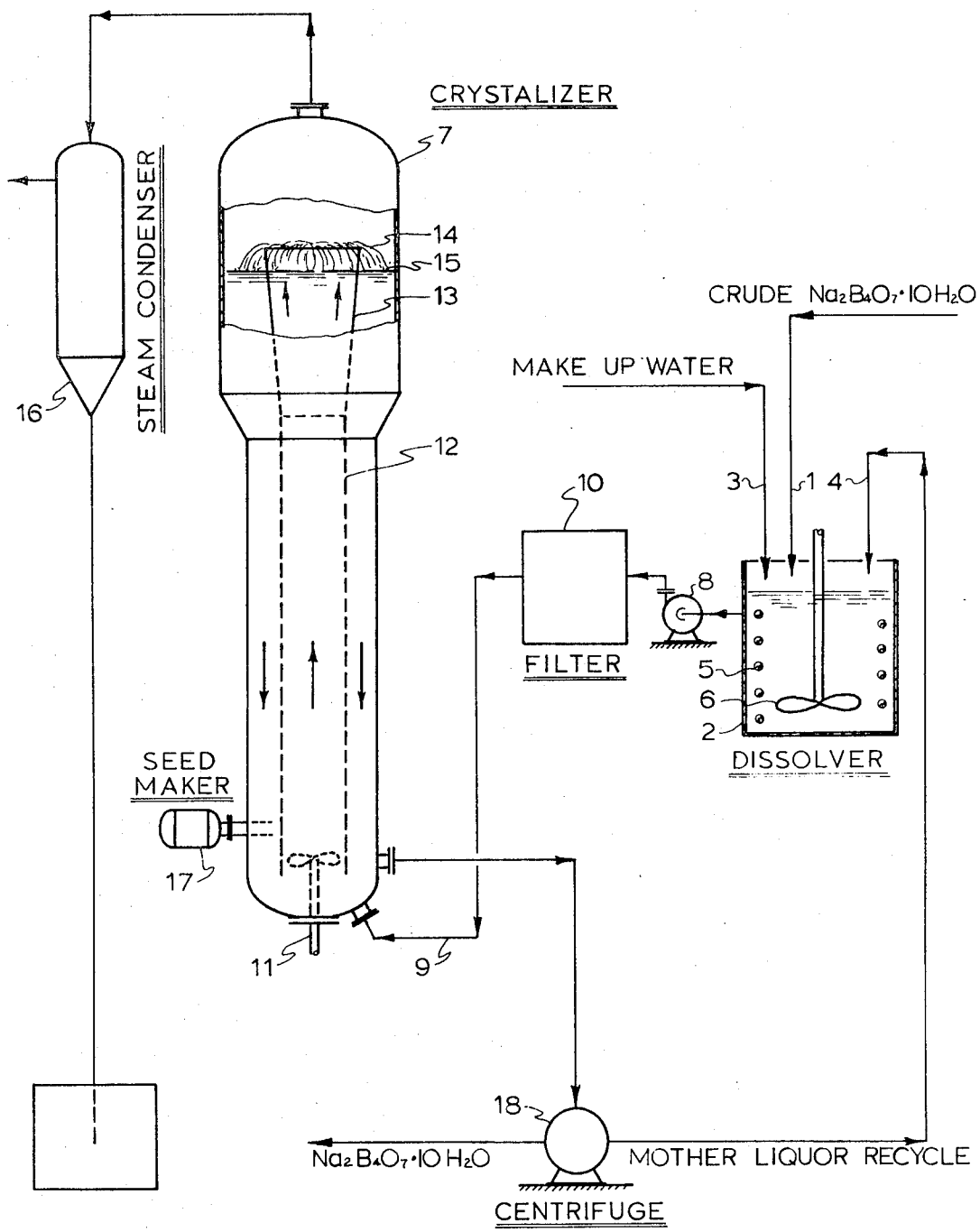

3,560,168
SINGLE CRYSTAL SODIUM TETRABORATE
DECAHYDRATE PRODUCTION
Lyman S. Stanton, Martinez, and James V. Wiseman,
Lafayette, Calif., assignors to Stauffer Chemical Company, New York, N.Y., a corporation of Delaware
Continuation of application Ser. No. 565,288, July 14, 1966. This application Sept. 2, 1969, Ser. No. 856,892
Int. Cl. B01d 7/02; C01b 15/12
U.S. Cl. 23—302                                    1 Claim

ABSTRACT OF THE DISCLOSURE

Process for producing single crystal borax by supersaturating an aqueous solution of borax containing slurried seed crystals to a low concentration and then allowing the supersaturated solution to return to normal saturation. Improved apparatus for generating seed crystals in a vertical vacuum cooling crystallizer is also described.

This application is a continuation of application S.N 565,288 filed July 14, 1966 and now abandoned.

This invention relates to the preparation of sodium tetraborate decahydrate. More particularly, this invention relates to the preparation of single crystal sodium tetraborate decahydrate of controlled crystal size.

Generally, sodium tetraborate decahydrate is prepared from crude borax. The crude borax is fed to a dissolver together with make-up water, and recycled mother liquor. The solution is heated and pumped to a crystallizer. When sodium tetraborate decahydrate is crystallized from aqueous solution it is prone to form multiple crystals. These multiple crystals take on many forms, such as twins, stars, or jumbled agglomerates. The stars often are long needles with several spires protruding from the crystal body at nearly right angles near the center. The above-mentioned multiple crystals are undesirable since they occlude mother liquor, are difficult to wash, are easily fractured in centrifuges and conveying equipment. Multiple crystals also cake worse than single crystals, they inherently are of lower purity and do not present a good appearance for marketing purposes. Hence, there exists a need for a convenient process to prepare single crystal sodium tetraborate decahydrate.

An object of this invention is to provide a process for preparing single crystal sodium tetraborate decahydrate.

A further object of this invention is to provide apparatus for preparing single crystal sodium tetraborate and a means for controlling said crystal size.

A still further object is to provide a process for the preparation of seed crystals in the crystallizer.

Further objects will be apparent during the description of this invention to those skilled in the art.

Generally stated, this invention provides a process for preparing single crystal sodium tetraborate decahydrate ($Na_2B_4O_7 \cdot 10H_2O$) of controlled crystal size by supplying new seed crystal nuclei as needed in a crystallizer containing a controlled supersaturated solution of sodium tetraborate decahydrate in a high circulation rate.

In the process of the present invention crude borax is dissolved in recycled mother liquor and make-up water. The dissolving solution is heated and agitated to assist dissolution of the crude borax. The heated solution is introduced into a crystallizer unit and cooled, wherein crystallization takes place. It is in the crystallizer unit that a means is provided for supplying nuclei seed crystals as needed. It has been discovered that crystals produced from seed crystals at a supersaturation of 0.010 pound of sodium tetraborate decahydrate per gallon of slurry or less will grow as single crystals. At supersaturations of more than 0.012 pound of sodium tetraborate decahydrate per gallon of slurry, multiple crystals are produced. Between the two concentrations, that is between 0.010 and 0.012 pound per gallon, the resulting crystals are erratic, containing both single crystals and those with dendritic growths. Although the exact mode of crystal growth that occurs in supersaturations of 0.012 lb./gal. or more is not clearly understood, there is often times a dendritic growth on the faces of the existing crystals. When broken off, multiple crystals form from the broken pieces of dendritic growth. If not broken off, new crystals grow on the surface of the original crystals, making agglomerates. It is believed that at supersaturations below 0.010 lb./gal. no dendritic growth takes place and hence there is no secondary nucleation. Only the existing crystals can get larger. Therefore a seed, produced as by mechanical breaking of a larger crystal to smaller ones, is very likely to have a single orientation especially if it came from a single crystal. The seed will quickly repair the fractured faces and grow to a new crystal. Since it is started with a single orientation and no dendritic growth occurs in the controlled supersaturation of 0.010 lb./gal. or less, it continues to grow as a single crystal. The applicants do not fully understand the mechanism involved in the growth of the single crystal and therefore do not wish to be limited to any specific mode of crystal growth in their interpretation and application of the instant invention. The preferred supersaturation is less than 0.010 pound of sodium tetraborate decahydrate per gallon of slurry in the crystallizer. Very low supersaturation values may be used, but due to economic considerations and the higher circulation rate required, values approaching the preferred supersaturation is desired. No benefit in crystalline product is obtained from the use of very low supersaturation concentrations.

The concentration of the supersaturation of sodium tetraborate decahydrate in the crystallizer is determined by dividing the yield of sodium tetraborate decahydrate crystals from the feed solution per unit time by the volume of slurry circulated per unit time. The yield of said crystals is determined by the total amount of sodium tetraborate decahydrate in a unit volume of feed solution less the sodium tetraborate decahydrate remaining in the mother liquor obtained by cooling and crystallizing the unit volume of feed solution. The values of supersaturation referred to herein are based on a slurry of approximately 30 weight-percent sodium tetraborate decahydrate. Other weight-percent slurries may be used, but this one finds special economic and mechanical handling advantages. At lower weight-percent slurries solutions of slightly higher supersaturation may be tolerated. Also in each case sufficient residual time must be provided to relieve the supersaturation before more feed solution is added. Operation with dilute slurries require a larger crystallizer to allow time to relieve the supersaturation.

The figure shows a diagrammatic flow sheet of the process. Crude borax ($Na_2B_4O_7 \cdot 10H_2O$) 1 s fed to a dissolver unit 2. Make-up water 3 and recycled mother liquor 4 are also introduced into the dissolver unit. To assist dissolution of the crude borax the dissolver is heated, for example by steam coils 5. At the same time the material in the dissolver is stirred with an agitator means 6. The resulting solution from the dissolver is passed by pump 8 to the crystallizer 7. Before passing the solution to the crystallizer, the solution may be clarified through the filter 10.

The solution 9 entering the crystallizer quickly mixes with the slurry of sodium tetraborate decahydrate crystals in the crystallizer. The slurry is circulated in the crystallizer by means of a propeller pump 11 up the central circulation pipe 12. Provision is made herein for a pump internally integrated with the crystallizer, however the pump means can also be located outside the crystallizer to provide the required circulation rate without departing from the scope of the invention. The central circulation pipe is concentrically disposed in the crystallizer housing and has its upper portion enlarged 13. The slurry propelled up the central circulation pipe overflows the circulation pipe 14 and falls to the liquid surface below 15. During the overflow process the slurry boils in the reduced pressure thereby reducing the slurry temperature and producing supersaturation. The steam produced from the boiling of the slurry is condensed by cooling liquid in a barometric condenser 16 which also controls the reduced pressure in the upper portion of the crystallizer. The slurry flows back to the circulating pump 11. While en route from the upper portion of the crystallizer to the propeller pump, the supersaturation induced by the boiling process as the slurry overflows the central circulation pipe is relieved by the growth of new crystal on the existing crystals. The growing crystals must be allowed to grow for a sufficient time to relieve the supersaturation before cooling the slurry again. This residence time is dependent upon the circulation rate as provided by the circulating pump 11 and the size of the crystallizer.

Provision is made for a seed generator 17 mounted on the crystallizer casing and protruding horizontally into the slurry. The seed generator produces new seed crystals by mechanically breaking larger crystals. The action of mechanically breaking the larger crystals is accomplished by means of a high sheer agitator. Said high sheer agitator. may be of various configurations. One such operable design was found to be a 6-inch sawtoothed disc with a plurality of teeth alternately peripherally disposed on the flat portions of the disc, said teeth resembling right triangles. One edge of the right angle of each right triangle is common to the disc, the other edge of the right angle is positioned to engage the maximum amount of slurry during the rotation of the disc. Said disc is securely mounted on the shaft of a high speed drive means. The average size of the crystals produced at a constant production rate varies inversely with the number of seed crystals supplied. Since all the seed crystals employed in the instant process may be supplied by the above-described mechanical means, the average crystal size is under positive control. Within the limits of desired crystal sizes the circulating pump contrbutes to the formation of all crystal sizes by the seed crystals formed by attrition in the pumping procedure. The seed crystals may also be supplied by the addition of dry seed crystals produced externally as by a grinder or by diverting part of the slurry and passing it through a wet roll crusher or a wet ball mill.

Crystals of sodium tetraborate decahydrate and mother liquor are removed from the crystallizer and separated, as by a centrifuge 18. The mother liquor 4 passes to the dissolver to be reused. The crystals ($Na_2B_4O_7 \cdot 10H_2O$) are dried of free water.

Consider as an illustrative example the operation of the instant process in a plant producing 250 tons/operating day of sodium tetraborate decahydrate single crystals.

In order to produce the required amount of tetraborate using a 14,000 gallon crystallizer, 348 lb./minute must be produced. The minimum circulation rate, considering the preferred limiting supersaturation, is 348/0.010=34,800 gallons per minute. To provide some margin for operating fluctuations, 40,000 gal./min. was used. In this example, considering the volume of the crystallizer and the circulation rate employed, the residence time of the seed crystals to relieve the supersaturation is about 20–21 seconds. The temperature rise in mixing in the feed solution is only about 0.2° F. and hence the cooling produced by boiling as the slurry is passed over the top of the recirculation pipe must be the same. A normal commercial crystallizing temperature is 100° F. In a 1.3 specific gravity slurry at 100° F. the boiling point rise from hydrostatic head is 1.69° F. per inch of head. To uniformly cool only 0.2° F. the slurry would have to be spread in very thin layers. In this example, a disengaging area of 12 ft. in diameter was used. Consequently liquor depths would range from 1 to 2 ft. as the liquor overflowed the circulating pipe. The result otherwise would be non-uniform cooling, with part of the liquor cooled several times 0.2° F. and some not cooled at all. Dendritic growth would then start in spots and multiple crystals would be produced. This problem of non-uniform cooling was relieved by elevating the discharge end of the central circulating pipe and overflowing the circulating slurry. While the slurry was in free fall in the overflow step, the hydrostatic head was avoided and all the slurry could be cooled uniformly by the boiling action. Under these conditions then the supersaturation does not exceed (348/40,000)=0.0087 lb./gal. This is less than the unfavorable supersaturation concentration at which dendritic growth begins.

Operating also in conjunction with the controlled supersaturation described supra is the seed generator. The seed generator herein contemplated is a high shear agitator which mechanically fractures larger crystals in the slurry in the crystallizer into smaller seed nuclei. The seed generator consists essentially of a saw-tooth edged disc impeller with protruding teeth, mounted vertically on a horizontal shaft entering the crystallizer through a sealed port on the outer casing of said crystallizer. A high speed drive means, such as an electric motor, air motor or the like, is employed to rotate the shaft-disc assembly of the seed generator. The saw-tooth edged impeller is in the slurry.

Since the crystal size is related to the number of nuclei present per unit time in the steady state condition of a continuous process, or in the case of a batch process to number of nuclei present per batch, by regulating the speed and time interval of the speed generator the crystal size may be positively controlled. This allows for the use of a very high speed seed generator run for intermittent period or a medium high speed seed generator operating for a continuous period. Similarly a plurality of said seed generators may be used to produce the required number of seed nuceli. Also the higher the circulation rate, the greater is the attrition in the circulating pump. Therefore, the circulating pump contributes slightly to the production of seed crystals. This then places a built-in maximum to the size of the crystals possible, the criteria being a function of the attrition produced in the circulating pump.

Illustrative of the operability of the high shear agitator as a seed generator and a means for regulating crystal size is the following example. In a slurry containing 30 weight percent sodium tetraborate decahydrate, a 6-inch high shear saw-toothed edge agitator disc was run continuously at approximately 3500 revolutions per minute. The seed crystals produced by the high shear agitator gave crystalline material of the size distribution listed in the following table.

TABLE.—SCREEN-SIZING ANALYSIS
[Sodium tetraborate decahydrate crystals]

| Mesh | Percent With seed generator | Percent Without seed generator |
|---|---|---|
| >+30 | 0.3 | 11.5 |
| −30 +40 | 1.3 | 16.6 |
| −40 +50 | 2.6 | 10.2 |
| −50 +60 | 3.9 | 7.5 |
| −60 +70 | 3.7 | 9.5 |
| −70 +80 | 6.5 | 9.7 |
| −80 +100 | 13.2 | 14.7 |
| −100 +150 | 30.4 | 11.6 |
| −150 +200 | 24.6 | 5.7 |
| <−200 | 13.4 | 3.2 |

It can be seen from the table of representative crystal size analysis that without the seed generator, the crystals produced from the same solution are of wide and even distribution with the tendency toward coarse crystals. The majority of crystals as shown in the table produced when the seed generator was in operation were in the −100 mesh to +200 mesh, fine to powder crystal size. It is contemplated that by using the seed generator as herein described the size of the crystals produced in the crystallizer can be regulated. This can be accomplished by controlling the number of seed crystals supplied by the generator, for example by running the seed generator intermittently, or by varying the speed of the agitator in the crystallizing slurry.

Various changes and modifications may be made without departing from the spirit and scope of the invention described herein as will be apparent to those skilled in the art to which it pertains. It is accordingly intended that the present invention shall only be limited by the scope of the appended claim.

We claim:

1. Process for preparing single crystal sodium tetraborate decahydrate comprising: dissolving crude borax, clarfying and filtering the aqueous solution of crude borax to remove insolubles, crystallizing said single crystals of sodium tetraborate decahydrate from a solution having a supersaturation of less than about 0.010 pound of sodium tetraborate decahydrate per gallon of slurry, adding seed crystals thereto in a high circulation crystallizer at a sufficient residence time for the crystallization to release supersaturation to prevent dendritic growth thereon producing only single crystals, separating said single crystals therefrom, recycling the mother liquor to other points in the process and drying said separated single crystals of sodium tetraborate decahydrate to remove free water, said single crystals having predominantly a mesh size of between −80 and −200.

References Cited

UNITED STATES PATENTS

| | | | |
|---|---|---|---|
| 476,592 | 6/1892 | Ascough | 23—302 |
| 2,130,065 | 9/1938 | Burke | 23—302 |
| 3,000,701 | 9/1961 | Nies | 23—302 |
| 3,069,229 | 12/1962 | Nies | 23—302 |
| 2,768,883 | 10/1956 | Young | 23—302 |

OTHER REFERENCES

Garrett, Crystalization of Borax, Industrial and Engineering Chemistry, vol. 50, No. 11, November 1958, pp. 1681–1684.

NORMAN YUDKOFF, Primary Examiner

A. F. PURCELL, Assistant Examiner

U.S. Cl. X.R.

23—60